(12) United States Patent
Matsumoto et al.

(10) Patent No.: US 8,894,524 B2
(45) Date of Patent: Nov. 25, 2014

(54) POWER TRANSMISSION CHAIN AND POWER TRANSMISSION SYSTEM INCLUDING THE SAME CHAIN

(75) Inventors: Kozue Matsumoto, Kashiba (JP); Seiji Tada, Kashiba (JP); Shigeo Kamamoto, Kashiwara (JP); Yasutaka Hojo, Namerikawa (JP)

(73) Assignees: JTEKT Corporation, Osaka-Shi, Osaka (JP); Todo Kogyo Co., Ltd, Namerikawa-Shi, Toyama (JP)

( * ) Notice: Subject to any disclaimer, the term of this patent is extended or adjusted under 35 U.S.C. 154(b) by 1010 days.

(21) Appl. No.: 12/449,257

(22) PCT Filed: Dec. 14, 2007

(86) PCT No.: PCT/JP2007/074170
§ 371 (c)(1),
(2), (4) Date: Jul. 30, 2009

(87) PCT Pub. No.: WO2008/093474
PCT Pub. Date: Aug. 7, 2008

(65) Prior Publication Data
US 2010/0099531 A1    Apr. 22, 2010

(30) Foreign Application Priority Data
Jan. 31, 2007 (JP) ................ 2007-021875

(51) Int. Cl.
*F16G 13/02* (2006.01)
*F16G 13/04* (2006.01)
*F16G 1/21* (2006.01)
*F16G 1/22* (2006.01)
*F16G 5/16* (2006.01)
*F16H 9/24* (2006.01)
*F16G 5/18* (2006.01)

(52) U.S. Cl.
CPC ... *F16H 9/24* (2013.01); *F16G 5/18* (2013.01)
USPC ............ 474/245; 474/206; 474/214; 474/215

(58) Field of Classification Search
CPC ..................................... F16G 5/18; F16H 9/24
USPC .......... 474/213, 215, 141, 245, 231, 206, 214
See application file for complete search history.

(56) References Cited

U.S. PATENT DOCUMENTS 3,359,815 A * 12/1967 Mueller et al. ................ 474/231
3,742,776 A *  7/1973 Avramidis .................... 474/215
(Continued)

FOREIGN PATENT DOCUMENTS

DE    10 2004 007 100 A1    9/2004
EP        1 719 933 A1       11/2006
(Continued)

OTHER PUBLICATIONS

European Search Report dated Nov. 10, 2010.
(Continued)

*Primary Examiner* — Henry Liu
(74) *Attorney, Agent, or Firm* — McGinn IP Law Group, PLLC

(57) ABSTRACT

A power transmission chain includes a plurality of link units which are aligned in a chain advancing direction, and each link unit includes a plurality of link plates which are aligned in a chain width direction W. The plurality of link plates include link plates which are punched out of a material by pressing to first and second specifications. A punching direction of the link plates to the first specification and a punching direction of the link plates to the second specification are made opposite to each other.

20 Claims, 12 Drawing Sheets

(56) References Cited

U.S. PATENT DOCUMENTS

| | | | |
|---|---|---|---|
| 4,915,675 A * | 4/1990 | Avramidis | 474/213 |
| 5,114,384 A | 5/1992 | Tsuyama | |
| 5,345,753 A * | 9/1994 | Okuda et al. | 59/5 |
| 5,902,203 A * | 5/1999 | Kanehira et al. | 474/213 |
| 6,272,835 B1 * | 8/2001 | Horie et al. | 59/6 |
| 6,299,559 B1 * | 10/2001 | Friedmann | 474/242 |
| 6,308,510 B1 * | 10/2001 | Christmas | 59/78 |
| 6,435,996 B2 * | 8/2002 | Horie et al. | 474/213 |
| 6,589,127 B1 * | 7/2003 | Horie et al. | 474/215 |
| 6,733,410 B2 * | 5/2004 | Saito | 474/212 |
| 6,939,260 B2 * | 9/2005 | Mu et al. | 474/212 |
| 7,007,451 B2 * | 3/2006 | Bachmair | 59/35.1 |
| 7,204,775 B2 * | 4/2007 | Teubert et al. | 474/215 |
| 2001/0023213 A1 * | 9/2001 | Horie et al. | 474/213 |
| 2007/0191166 A1 * | 8/2007 | Yasuhara et al. | 474/245 |
| 2008/0161148 A1 * | 7/2008 | Tada et al. | 474/245 |
| 2009/0054187 A1 * | 2/2009 | Pflug | 474/141 |

FOREIGN PATENT DOCUMENTS

| | | |
|---|---|---|
| JP | 47-43744 | 12/1972 |
| JP | 52-52058 | 4/1977 |
| JP | 60 93051 | 6/1985 |
| JP | 60-93051 | 6/1985 |
| JP | 10-30685 | 2/1998 |
| JP | 2006-097844 | 4/2006 |
| JP | 2006-234019 | 9/2006 |

OTHER PUBLICATIONS

Japanese Office Action dated Apr. 19, 2012, with English-language translation.

* cited by examiner

POWER TRANSMISSION CHAIN AND POWER TRANSMISSION SYSTEM INCLUDING THE SAME CHAIN

TECHNICAL FIELD

The present invention relates to a power transmission chain and a power transmission system including this same chain.

BACKGROUND ART

For example, an endless power transmission chain for use in a power transmission system such as an automotive pulley type continuously variable transmission (CVT) or the like has a plurality of link plates which are stacked in a lateral width direction of the chain and pins which connect the link plates together (for example, refer to JP-A-2006-97844). Power is transmitted through engagement between both end faces of the pins and pairs of sheave surfaces of pulleys.

DISCLOSURE OF THE INVENTION

Problem that the Invention is to Solve

Normally, although the link plates are formed by punching thin sheet steel by the use of a die and a punch, warping is generated in the link plates in a punching direction. As a result of a power transmission chain being formed using the warped link plates, the power transmission chain does not extend straight with respect a chain advancing direction (a rotating direction) and there is caused in the chain a portion which is largely warped in a chain lateral width direction. In case there is a large warp in the power transmission chain, the position of each pin largely deviates with respect to the chain lateral width direction, and when the pin is brought into engagement with the pulley, only one end face of the pin comes into contact with the sheave surface, whereby both the pin and the pulley are brought into contact with each other with impact. A large load is applied to the pin and the pulley, and a resulting contact sound configures a cause for noise.

The invention has been made based on the background described above, and an object thereof is to provide a power transmission chain which can increase the durability in a practical use and reduce the noise and a power transmission system which includes this same chain.

Means for Solving the Problem

With a view to attaining the object, a first aspect of the invention provides a power transmission chain comprising a plurality of link plates which are aligned in a chain advancing direction and a plurality of connecting members which connect these link plates together in such a manner that they can flex, characterized in that the plurality of link plates include first and second specification link plates which are punched from a material by a press, and in that a punching direction of the first specification link plates and a punching direction of the second specification link plates are made to be opposite to each other.

Note that the parenthesized Arabic numerals denote corresponding constituent elements in embodiments that will be described later. Hereinafter, this will also be true in the following paragraphs.

According to the invention, the first and second specification link plates warp in the directions opposite to each other. By using these link plates which warp in the directions opposite to each other, the warping of the power transmission chain can be prevented from becoming large towards one or the other of chain lateral width directions. By this, the deviation of an engagement starting position of the power transmission chain with the pulley or the like when the former is brought into engagement with the latter is reduced with respect to the chain lateral width direction so as to attain a smooth engagement of both the members. By reducing the impact acting on the power transmission chain so as to reduce the load acting thereon, an increase in the durability in a practical use and a reduction in noise can be attained.

In addition, in a second aspect of the invention, there may be a case where the power transmission chain comprises a plurality of link units which are aligned in the chain advancing direction, each of the link units includes a plurality of link plates which are aligned in a chain width direction which is orthogonal to the chain advancing direction, and the plurality of link plates of each of the link units include the first and second specification link plates. In this case, the warping of each link unit can be reduced with respect to the chain width direction, whereby the warping of the overall power transmission chain can be prevented from becoming large.

Additionally, in a third aspect of the invention, there may be a case where in each of the link units, the first specification link plates and the second specification link plates are arranged alternately with respect to the chain width direction. In this case, in each link unit, the number of first specification link plates and the number of second specification link plates can be made substantially the same, thereby making it possible to reduce the warping in the chain width direction remarkably.

In addition, in the fourth aspect of the invention, there may be a case where in each of the link units, the first specification link plates are disposed adjacent to each other and the second specification link plates are disposed adjacent to each other with respect to the chain width direction. In this case, the warping of the power transmission chain with respect to the chain width direction can be reduced by the simple configuration in which the link plates if the same specifications are disposed adjacent to each other.

Additionally, in a fifth aspect of the invention, there may be a case where the power transmission chain comprises a plurality of link units which are aligned in the chain advancing direction, the plurality of link units each include a plurality of link plates which are aligned in a chain width direction which is orthogonal to the chain advancing direction,and the plurality of link units include a first specification link unit which includes only the first specification link plates and a second specification link unit which includes only the second specification link plates. In this case, the arrangement of the link plates of each link unit can be made simple, whereby the link plates can be disposed simple.

Additionally, in a sixth aspect of the invention, there may be a case where each of the connecting members includes a power transmission member which is brought into engagement with sheave surfaces of pulleys in such a manner as to transmit the power, the power transmission member is inserted into each of a pair of through holes which is formed in each of the first specification link plate and the second specification link plate, a disposing pitch of the pair of power transmission members which are inserted into the pair of through holes in the first specification link plate is made relatively short, and a disposing pitch of the pair of power transmission members which are inserted into the pair of through holes in the second specification link plate is made relatively long.

In this case, by making the disposing pitches differ from each other, there can be provided a portion where an engagement cycle in which the power transmission members come sequentially into engagement with the pulleys becomes uneven, whereby the frequency of engagement noise can be dispersed so as to attain a further reduction in noise level. In addition, by making the link units which have the different disposing pitches warp in the directions opposite to each other, the disposing pitches can be identified easily.

In addition, in a seventh aspect of the invention, there may be a case where the first and second specification link plates include identification portions which indicate corresponding punching directions. In this case, the punching directions of the link plates can be identified easily and in ensured fashion by the identification portions.

In addition, in an eight aspect of the invention, there may be a case where a power transmission system comprises first and second pulleys which each have a pair of conical sheave surfaces facing each other and the aforesaid power transmission chain which is extended between the pulleys in such a manner as to be wound therearound, so as to be brought into engagement with the sheave surfaces for transmission of the power. In this case, the power transmission system can be realized which is superior with respect to the durability in practical use and quietness.

BEST MODE FOR CARRYING OUT THE INVENTION

Preferred embodiments of the invention will be described by reference to the accompanying drawings.

Figure 1:
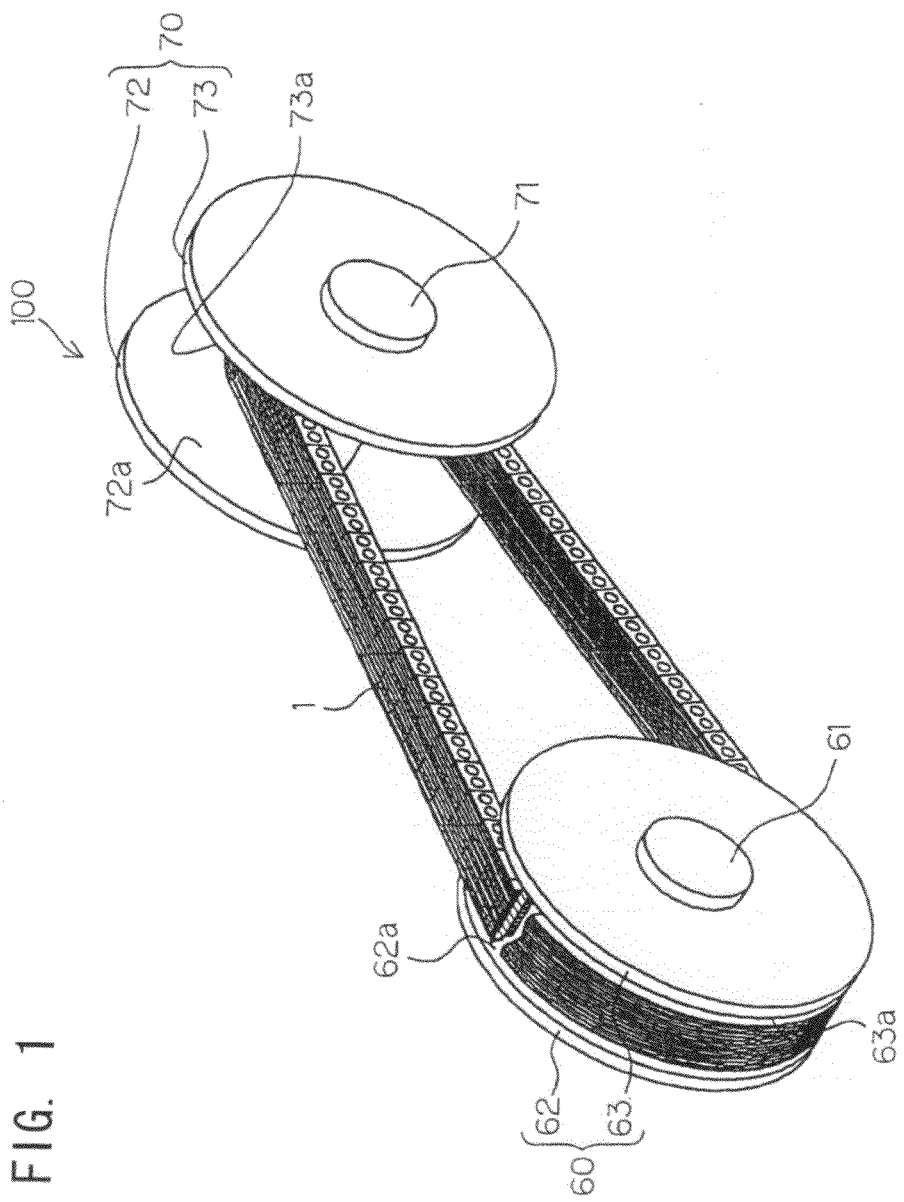
FIG. 1 is a perspective view showing exemplarily the configuration of a main part of a chain type continuously variable transmission which includes a power transmission chain according to an embodiment of the invention.

FIG. 1 is a perspective view showing exemplarily the configuration of a main part of a chain type continuously variable transmission (hereinafter, also referred to simply as a continuously variable transmission) which includes a power transmission chain according to an embodiment of the invention. Referring to FIG. 1, a continuously variable transmission 100 is such as to be installed in a vehicle like a motor vehicle and includes a drive pulley 60 made of a metal (such as a structural steel) as a primary pulley, a driven pulley 70 made of a metal (such as a structural steel) as a secondary pulley, and an endless power transmission chain 1 (hereinafter, also referred to simply as a chain) which is extended between both the pulleys in such a manner as to be wound therearound. Note that the chain 1 in FIG. 1 is shown partially in section for the purpose of easy understanding.

Figure 2:
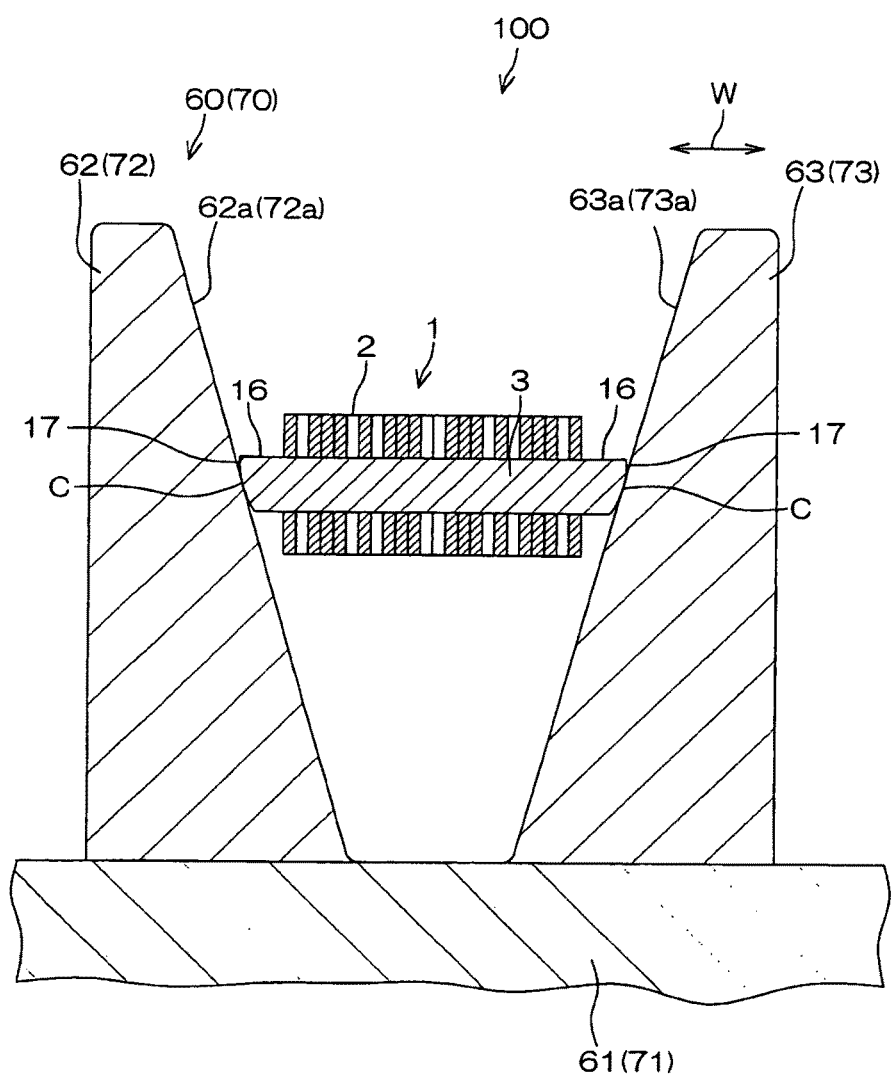
FIG. 2 is a partially enlarged sectional view of a drive pulley (a driven pulley) and a chain which are shown in FIG. 1.

FIG. 2 is a partially enlarged sectional view of the drive pulley 60 (the driven pulley 70) and the chain 1 shown in FIG. 1. Referring to FIGS. 1 and 2, the drive pulley 60 is such as to be attached to an input shaft 61 in such a manner as to rotate together therewith, the input shaft 61 connecting to a drive source of the vehicle in such a manner as to transmit the power from the drive source, and the drive pulley 60 includes a fixed sheave 62 and a movable sheave 63. The fixed sheave 62 and the movable sheave 63 have sheave surfaces 62a, 63, respectively, which face and pair up with each other. The sheave surfaces 62a, 63a each include an inclined surface which has a circular conical surface configuration. A groove is defined between these sheave surfaces 62a, 63a, and the chain 1 is made to be held in place under a high pressure between the sheave surfaces 62a, 63a by this groove.

In addition, a hydraulic actuator (not shown) is connected to the movable sheave 63 so as to alter a groove width, and when changing speed ratios, the groove width is made to change by the movable sheave 63 being caused to move in an axial direction (a left-right direction in FIG. 2) of the input shaft 61. By this, the chain 1 is caused to move in a radial direction (a vertical direction in FIG. 2) of the input shaft 61, so as to change an effective radius of the pulley 60 with respect to the chain 1 (hereinafter, also referred to as an effective radius of the pulley 60).

On the other hand, as shown in FIGS. 1 and 2, the driven pulley 70 is attached to an output shaft 71 in such a manner as to rotate together therewith, the output shaft 71 connecting to drive wheels (not shown) in such a manner as to transmit the power thereto, and as with the drive pulley 60, the driven pulley 70 includes a fixed sheave 73 and a movable sheave 72 which have sheave surfaces 73a, 72a, respectively, which face and pair up with each other so as to form a groove which holds the chain 1 in place under a high pressure between the sheave surfaces 73a, 72a.

As with the movable sheave 63 of the drive pulley 60, a hydraulic actuator (not shown) is connected to the movable sheave 72 of the driven pulley 70, so that when changing speed ratios, a groove width is made to change by the movable sheave 72 being caused to move. By this, an effective radius of the pulley 70 with respect to the chain 1 (hereinafter, also referred to as an effective radius of the pulley 70) is made to change by the chain 1 being caused to move.

Figure 3:
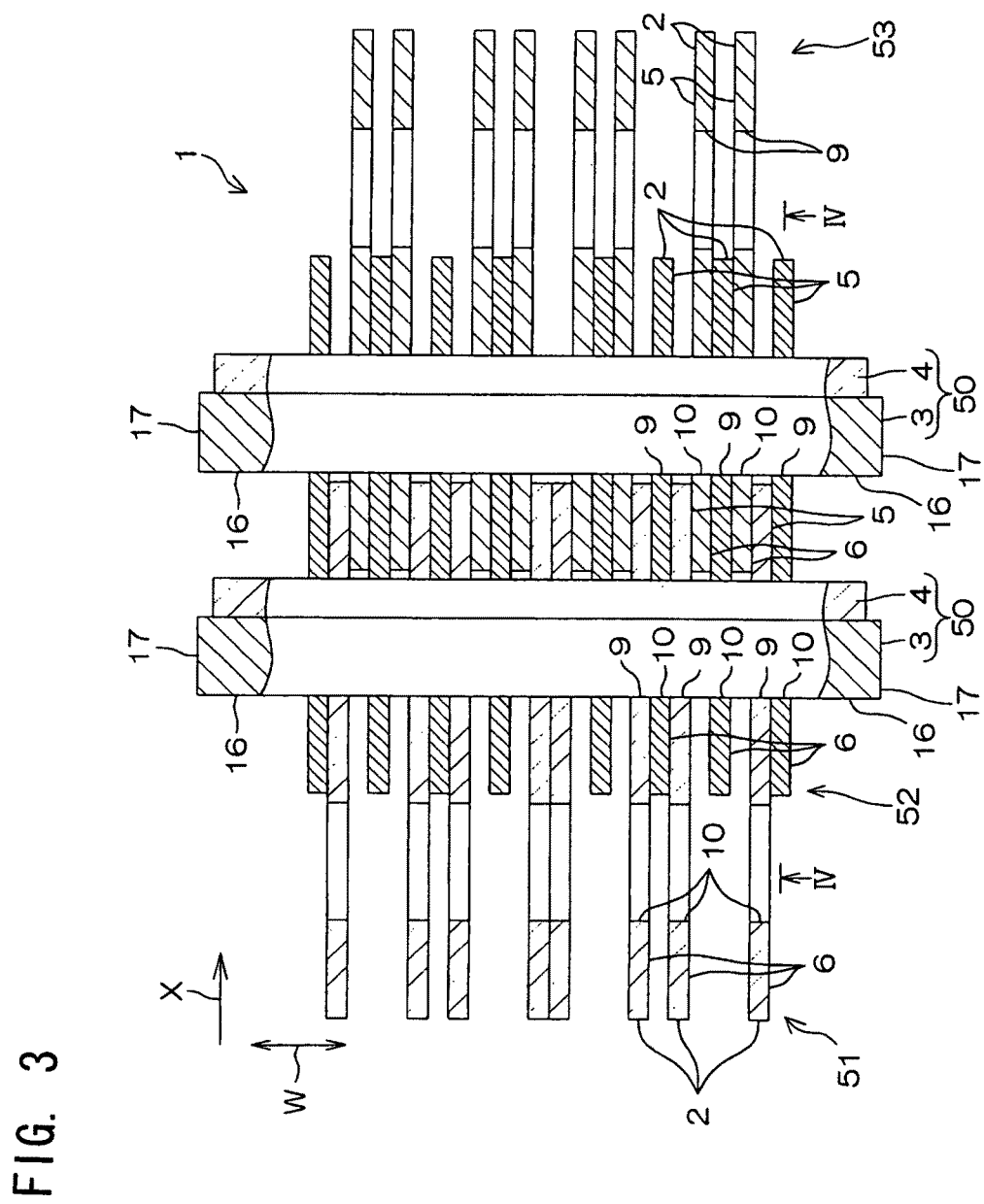
FIG. 3 is a partially sectional view of a main part of the chain.
Figure 4:
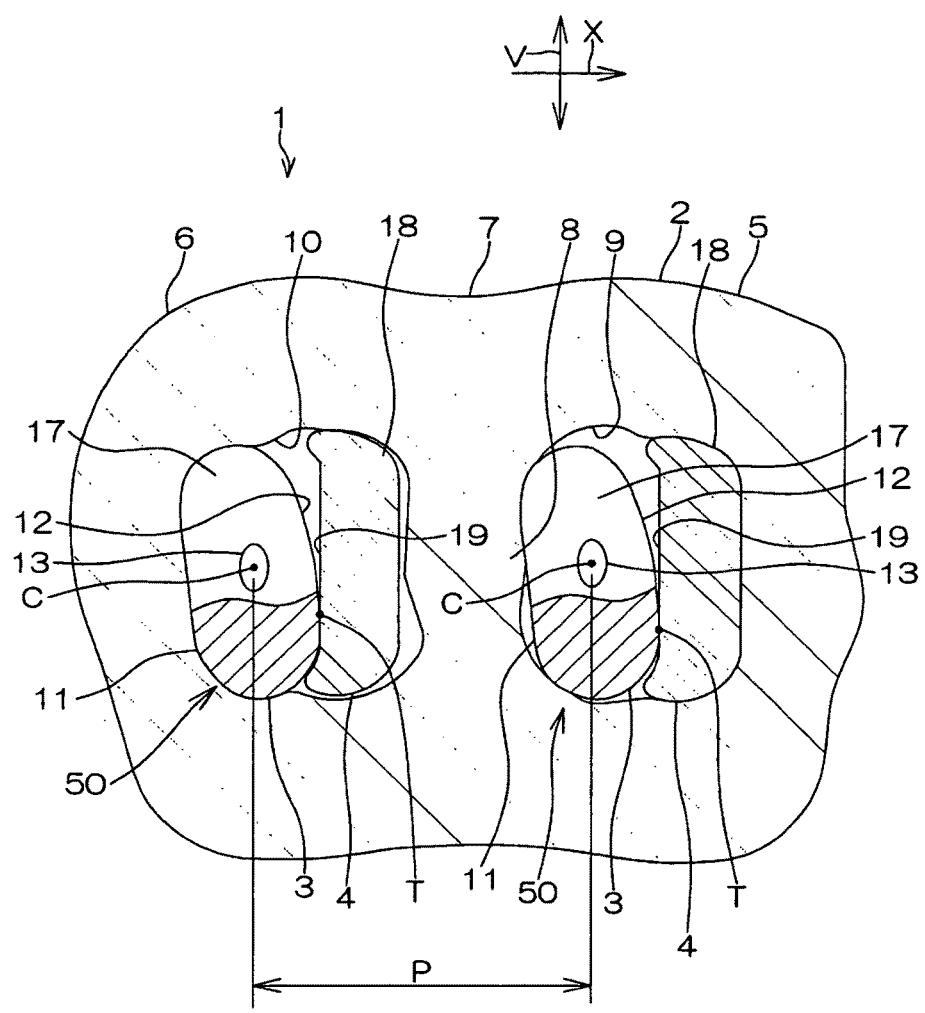
FIG. 4 is a partially sectional view taken along the line IV-IV in FIG. 3.

FIG. 3 is a partially sectional view of a main part of the chain 1. FIG. 4 is a partially sectional view taken along the line IV-IV in FIG. 3. Note that hereinafter, the description will be made based on a straight-line area of the chain 1. Referring to FIGS. 3 and 4, the chain 1 includes a plurality of link plates 2 and a plurality of connecting members 50 which connect these link plates together in such a manner as to flex.

Hereinafter, a direction which follows an advancing direction of the chain 1 is referred to as a chain advancing direction X, a direction which is orthogonal to the chain advancing direction X and which follows a longitudinal direction of the connecting members 50 is referred to as a chain width direction W, and a direction which is orthogonal to both the chain advancing direction and the chain width direction is referred to as an orthogonal direction V.

Each link plate 2 includes a front end portion 5 and a rear end portion 6 which form a pair of end portions which are aligned at the front and rear of the link plate 2 along the chain advancing direction X and an intermediate portion 7 which is disposed between these front end portion 5 and rear end portion 6.

A front through hole 9 as one of a pair of through holes and a rear through hole 10 as the other of the pair of through holes are formed at the front end portion 5 and the rear end portion 6, respectively. The intermediate portion 7 has a pillar portion 8 which configures a partition between the front through hole 9 and the rear through hole 10. This pillar portion 8 has a predetermined thickness in the chain advancing direction X.

A plurality of link units 51, 52, 53, . . . (link units 51 to 53 are shown as examples in FIG. 3) are formed by the use of link plates 2. The link units 51, 52, 53, . . . each include a plurality of link plates 2 which are aligned in the chain width direction W and each include the same number of (for example, eight) link plates 2.

In each of the link units 51, 52, 53, . . . , the link plates 2 in the same link unit are aligned in such a manner that their positions with respect to the chain advancing direction X become identical to one another. The respective link units 51, 52, 53, . . . are disposed in such a manner as to be aligned along the chain advancing direction.

The link plates 2 of each of the link units 51, 52, 53, . . . are connected individually to the corresponding link plates 2 of the adjoining link unit of the link units 51, 52, 53, . . . by the use of a corresponding connecting member 50 in such a manner as to flex.

Specifically, the front through holes 9 in the link plates 2 of the first link unit 51 are aligned correspondingly with the rear through holes 10 in the link plates 2 of the second link unit 52 in the chain width direction W, and the link plates 2 of the first and second link units 51, 52 are connected together in such a manner as to flex in the chain advancing direction X by the connecting member 50 which extends through the through holes 9, 10.

Similarly, the front through holes 9 in the link plates 2 of the second link unit 52 are aligned correspondingly with the rear through holes 10 in the link plates 2 of the third link unit 53 in the chain width direction W, and the link plates 2 of the second and third link units 52, 53 are connected together in such a manner as to flex in the chain advancing direction X by the connecting member 50 which extends through the through holes 9, 10.

As has been described above, the link plates 2 of the two adjoining link units in the chain advancing direction X are connected together by the corresponding connecting member 50 in a sequential fashion, so as to form the endless chain 1.

Each connecting member 50 includes first and second pins 3, 4 which pair up with each other, and these first and second pins 3, 4 are made to be brought into rolling and sliding contact with each other as the corresponding link plates 2 flex. Note that the rolling and sliding contact means a contact which involves at least one of a rolling contact and a sliding contact.

The first pin 3 is a long power transmission member which extends in the chain width direction W. A circumferential surface 11 of the first pin 3 is formed into a smooth surface and has a front portion 12 which functions as a facing portion which faces forwards in the chain advancing direction X. The front portion 12 faces the second pin 4 which pairs up with the first pin 3 and is brought into rolling and sliding contact with a rear portion 19, which will be described later, of the second pin 4 at a contact portion T (a contact point as viewed from the chain width direction W).

A pair of end portions 16 in a longitudinal direction (the chain width direction W) of the first pin 3 are made to project in the chain width direction W, respectively, from the link plates 2 which are disposed at a pair of end portions in the chain width direction W. End faces 17 are provided at the pair of end portions 16 in such a manner as to function as a pair of power transmitting portions.

Referring to FIGS. 2 and 4, these end faces 17 are intended to be brought into friction contact (engagement) with the corresponding sheave surfaces 62a, 63a, 72a, 73a of the respective pulleys 60, 70 via films of a lubricant.

The first pin 3 is held between the corresponding sheave surfaces 62a, 63a, 72a, 73a, whereby the power is transmitted between contact areas 13 of the end faces 17 of the first pin 3 and the respective pulleys 60, 70. Since the contact areas 13 of the first pin 3 contribute to the direct transmission of power, the first pin 3 is formed of a material such as a bearing steel (SUJ2) which has a high strength and a superior wear resistance. When viewed along the chain width direction W, the contact area 13 has, for example, an oval shape, and a center of this oval configures a contact center point C.

Referring to FIGS. 3 and 4, the second pin 4 (also referred to as a strip or an inter-piece) is a long member which is formed of the same material that is used for the first pin 3 and which extends in the chain width direction W. The second pin 4 is formed shorter than the first pin 3 in such a manner that a pair of end portions of the second pin 4 are not brought into contact with the sheave surfaces of the respective pulleys.

A circumferential surface 18 of the second pin 4 extends in the chain width direction W. This circumferential surface 18 has a rear portion 19 as a facing portion which faces rearwards of the chain advancing direction W. The rear portion 19 includes a flat surface which is at right angles to the chain advancing direction X. The flat surface of the rear portion 19 faces the front portion 12 of the first pin 3 which pairs up with the second pin 4.

The chain 1 is referred to as a so-called press-fit chain. Specifically, the first pin 3 is fitted relatively movably in the front through hole 9 in each link plate 2, and the second pin 4, which pairs up with the first pin 3, is press fitted fixedly in the front through hole 9, whereas the first pin 3 is press fitted fixedly in the rear through hole in each link plate 2, and the second pin 4, which pairs up with the first pin 3, is fitted relatively movably in the rear through hole 10.

By the configuration described above, the front portion 12 of the first pin 3 and the rear portion 19 of the second pin 4, which pairs up with the front portion 12, are brought into rolling and sliding contact with each other at the contact portion T as the adjoining link plates 2 flex in the chain advancing direction X.

The chain 1 has a predetermined disposing pitch P. The disposing pitch P denotes a distance between contact center points C of the adjacent first pins 3 in the straight-line area of the chain 1. In this embodiment, the connecting pitch P is set to, for example, 8 mm.

As viewed along the chain width direction W, the configuration of a portion of the front portion 12 which can contact the rear portion 19 of the second in 4 is made into an involute curve. By this, when the adjoining link plates 2 flex, the corresponding first and second pins 3, 4 can be brought into smooth rolling contact with each other, so as to attain a smooth flexure between the adjoining link plates, thereby making it possible to suppress the oscillating chord-like motion of the chain 1.

Figure 5:
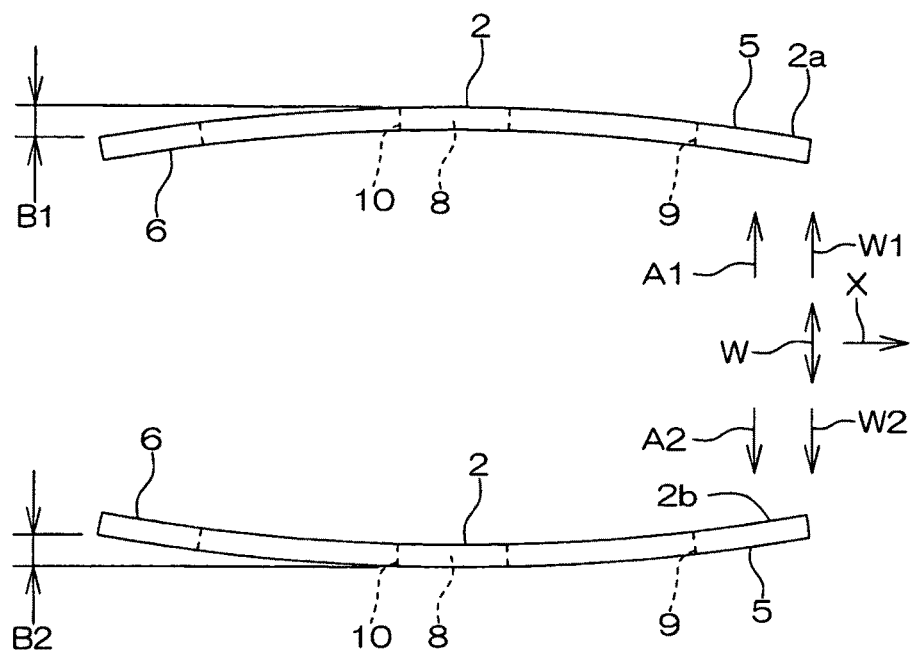
FIG. 5 is a diagram showing first and second specification link plates being single components when they are viewed along an orthogonal direction.

Referring to FIG. 5, the embodiment is characterized in that the link plates 2 include first and second specification link plates 2a, 2b link plates which are punched from a material by a press, and in that a punching direction A1 of the first specification link plates 2a and a punching direction A2 of the second specification link plates 2b are made to be opposite to each other.

As a material for the first and second specification link plates 2a, 2b, a sheet of steel made of the SK5 steel or the like which is specified under JIS (Japanese Industrial Standard) can be raised as an example. By this material being punched using a die (a female mold) and a punch (a male mold) (not shown), the first and second specification link plates 2a, 2b are formed.

The first specification link plate 2a warps towards the other W2 side of the chain width direction W at the front end portion 5 and the rear end portion 6, whereas the second specification link plate 2b warps towards one W1 side of the chain width direction W at the front end portion 5 and the rear end portion 6.

A warping amount B1 of the first specification link plate 2a with respect to the chain width direction W is set to fall within a range of 5 μm to 10 μm, for example. A warping amount B2 of the second specification link plate 2b is substantially the same as the warping amount B1 of the first specification link plate 2a.

The first specification link plate 2a is formed using, for example, a punch which is disposed relatively upwards with respect to a vertical direction and a die which is disposed relatively downwards with respect to the vertical direction. Similarly, the second specification link plate 2b is formed using, for example, a punch which is disposed relatively upwards with respect to the vertical direction and a die which is disposed relatively downwards with respect to the vertical direction. Orientations of the front portions 5 of the first and second specification link plates 2a, 2b which result momentarily as the material is punched become opposite to each other. Configurations of the first and second specification link plates 2a, 2b which result momentarily as the material is punched become symmetrical with each other.

Figure 6:
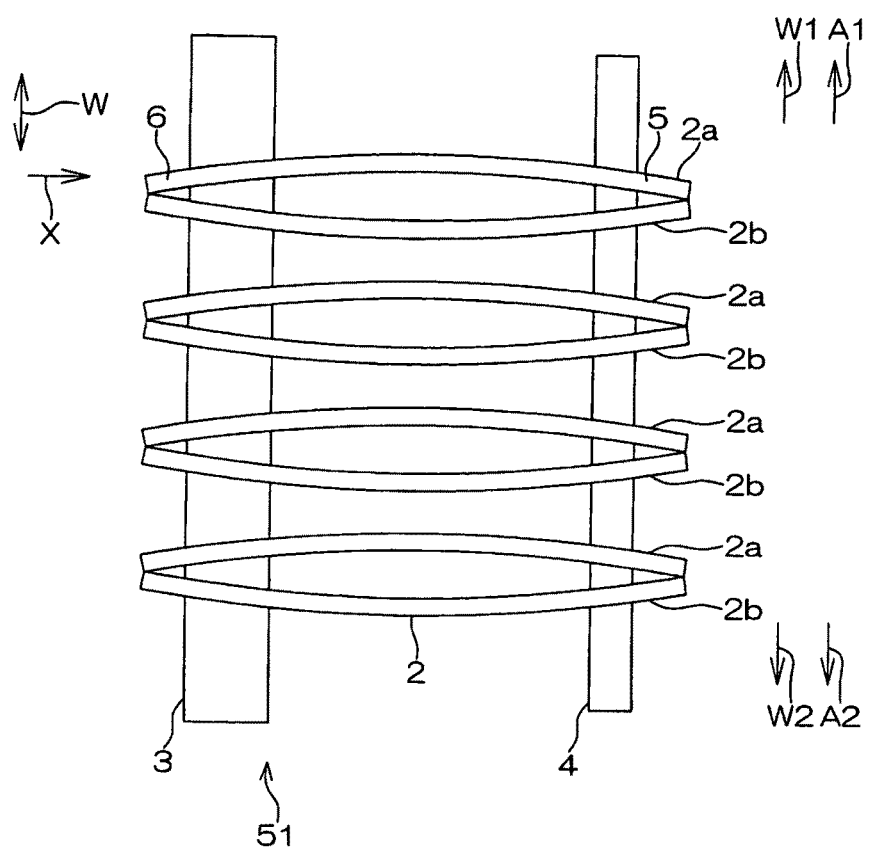
FIG. 6 is a diagram showing the main part of the chain as viewed along the orthogonal direction.

FIG. 6 is a diagram showing the main part of the chain 1 as viewed along an orthogonal direction V. Referring to FIG. 6, in each of the link units 51, 52, 53, . . . (in FIG. 6, the link row 51 is shown as a representative), the same numbers of first and second specification link plates 2a, 2b are disposed.

In this embodiment, due to the number of link plates in each of the link units 51, 52, 53, . . . being eight, in each of the link plates 51, 52, 53, . . . , four first specification link plates 2a and four second specification link plates 2b are provided.

These first and second specification link plates 2a, 2b are disposed alternately with respect to the chain width direction W. Due to the same numbers of link plates 2a, 2b to the first and second specifications being provided in each of the link units 51, 52, 53, . . . , the numbers of first and second specification link plates 2a, 2b are made equal in the entirety of the chain 1.

Figure 7A:
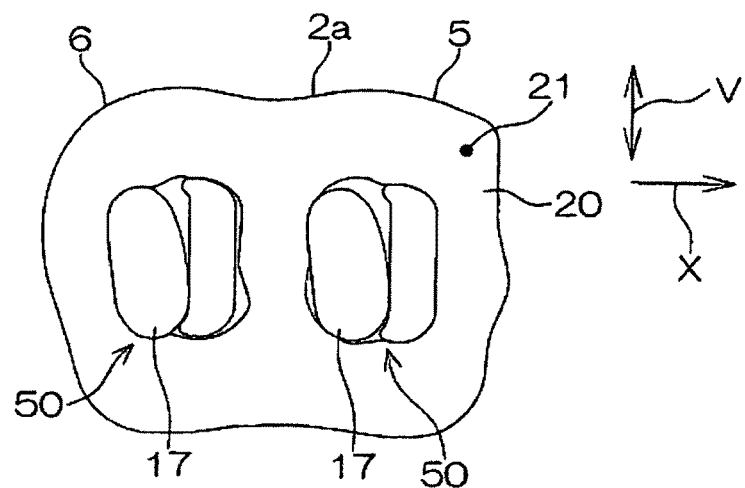
FIG. 7A is a diagram illustrating an identification portion of the first specification link plate.

Identification portions for identifying the punching directions are provided individually on the first specification link plates 2a and the second specification link plates 2b. Specifically, as shown in FIG. 7A, an identification portion 21 having a circular shape is formed on one side 20 of the first specification link plate 2a which configures an inner side of the warp. This identification portion 21 includes a punched hole or a depressed portion which is formed, for example, when the first specification link plate 2a is punched out of the material by the press, and the diameter of the identification portion is referred to as ranging approximately from 0.5 mm to 1.0 mm, and consequently, the identification portion becomes visible.

In addition, this identification portion 21 is formed closer to the front end portion 5 of the link plate 2a to the first specification and also functions as an identification portion which indicates the chain advancing direction X.

Figure 7B:
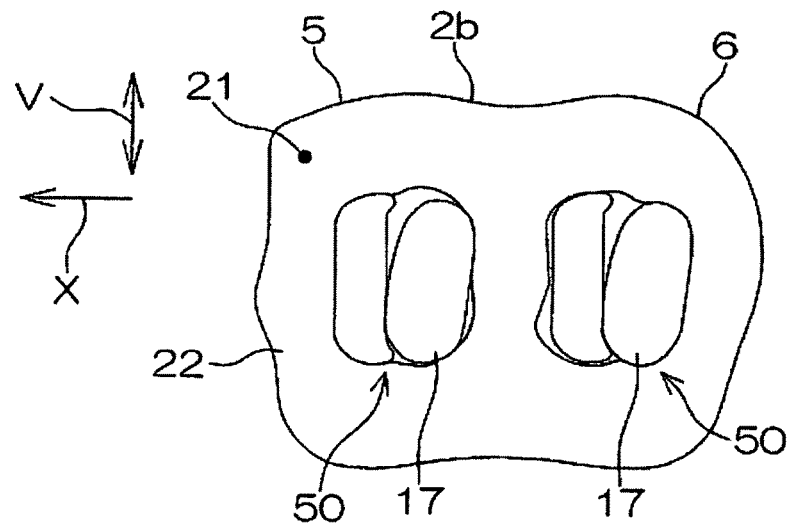
FIG. 7B is a diagram illustrating an identification portion of the second specification link plate.

Similarly, as shown in FIG. 7B, an identification portion 21 is imparted to the other side 22 of the second specification link plate 2b which configures an inner side of the warp. This identification portion 21 is formed closer to the front end portion 5 of the second specification link plate 2b and also functions as an identification portion which indicates the chain advancing direction X.

Referring again to FIG. 3, the individual link plates 2 are disposed in such a manner as to press against the adjoining link plates 2 in the chain width direction W. By this, a force acts on the individual link plates 2 in such a way as to force the individual link plates 2 to extend straight in the chain advancing direction X, whereby the individual link plates 2 are made to extend straight along the chain advancing direction X.

According to this embodiment, the following function and advantage can be provided. Namely, the first and second specification link plates 2a, 2b warp in the opposite directions with respect to the chain width direction W. By using these link plates 2a, 2b which warp in the directions opposite to each other, the warp of the chain 1 can be prevented from becoming large towards the one W1 side or the other W2 side of the chain width direction W. By this, the respective positions of the first pins 3 of the chain 1 can be aligned with respect to the chain width direction W, whereby the deviation of an engagement starting position where the pair of end faces 17 of the first pin 3 are brought into engagement with the individual pulleys 60, 70 when both the end faces are brought into engagement therewith is reduced, thereby making it possible to attain a smooth engagement of the first pin 3 with the individual pulleys 60, 70. By the impact exerted on the chain 1 being reduced so as to reduce the load exerted thereon, an increase in durability in practical use and a reduction in noise can be attained.

In addition, by the first and second specification link plates 2a, 2b being provided in each of the link units 51, 52, 53, . . . , the warps of the link units 51, 52, 53, . . . can be offset with respect to the chain width direction W, whereby the warp of the chain 1 as a whole can be prevented from becoming large.

Additionally, in each of the link units 51, 52, 53, . . . , the first specification link plates 2a and the second specification link plates 2b are arranged alternately with respect to the chain width direction W. By this, in each of the link units 51, 52, 53, . . . , the numbers of first specification link plates 2a and second specification link plates 2b can be made the same, whereby the warp in the chain width direction W can be reduced remarkably.

In this way, by the numbers of first and second specification link plates 2a, 2b being made equal in each of the link units 51, 52, 53, . . . , the warp of each of the link units 51, 52, 53, . . . can be reduced remarkably.

In addition, the identification portions 21 which indicate the corresponding punching directions are provided on the first and second specification link plates 2a, 2b, respectively. By this, the punching directions A1, A2 of the individual link plates 2a, 2b can be identified easily and in an ensured fashion by the identification portions 21.

Further, the specifications of the link plates 2 can be identified by the respective warping directions of the first and second specification link plates 2a, 2b.

In addition, in contrast to the conventional chain in which the punching directions of all the link plates are the same, in the chain 1 of this embodiment, only the minor alteration is made in which the punching directions A1, A2 of the first and second specification link plates 2a, 2b are made to differ, and consequently, the projection efficiency and production costs remain almost the same as those of the conventional chain links. In addition, the number of components involved in the chain 1 of this embodiment also remains the same as those of the conventional chain, and consequently, an increase in production costs can be suppressed in this respect.

Thus, according to the power transmission chain described heretofore, a continuously variable transmission 100 can be realized which is superior in durability in practical use and noise level.

Figure 8:
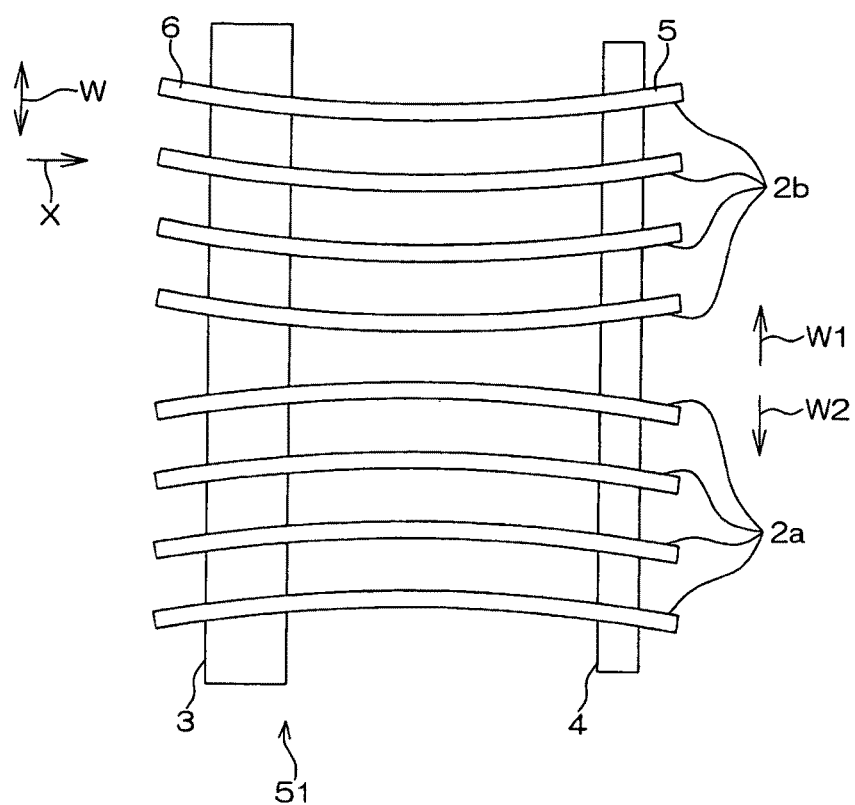
FIG. 8 is a diagram showing a main part of another embodiment of the invention as viewed along the orthogonal direction.

FIG. 8 is a diagram showing a main part of another embodiment of the invention as viewed in the orthogonal direction V. Note that in the following description, features which are different from those of the embodiment shown in FIGS. 1 to 7B will be described, and like reference numerals will be given to like configurations, so as to omit the description thereof.

Referring to FIG. 8, this embodiment is characterized in that in each of link units 51, 52, 53, . . . (a link unit 51 is shown as a representative in FIG. 8), first specification link plates 2a are disposed adjacent to each other and second specification link plates 2b are disposed adjacent to each other with respect to a chain width direction W.

In each of the link units 51, 52, 53, . . . , the first specification link plates 2a are disposed towards the other W2 side of the chain width direction W and the second specification link plates 2b are disposed towards one W1 side of the chain width direction W.

According to this embodiment, the warp of the chain 1 with respect to the chain width direction W can be reduced by the simple configuration in which the link plates of the same specifications are disposed adjacent to each other.

Figure 9:
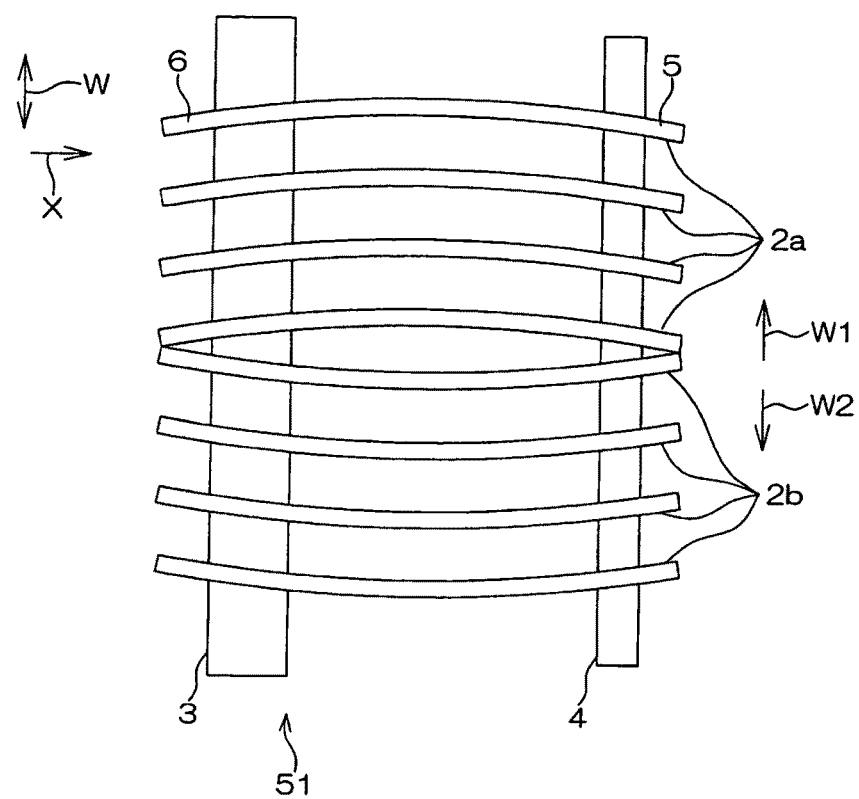
FIG. 9 is a diagram showing a main part of a further embodiment of the invention as viewed along the orthogonal direction.

Note that in place of the embodiment shown in FIG. 8, as shown in FIG. 9, the first specification links 2a may be disposed towards the one W1 side of the chain width direction, and the second specification links 2b may be disposed towards the other W2 side of the chain width direction W.

Figure 10A:
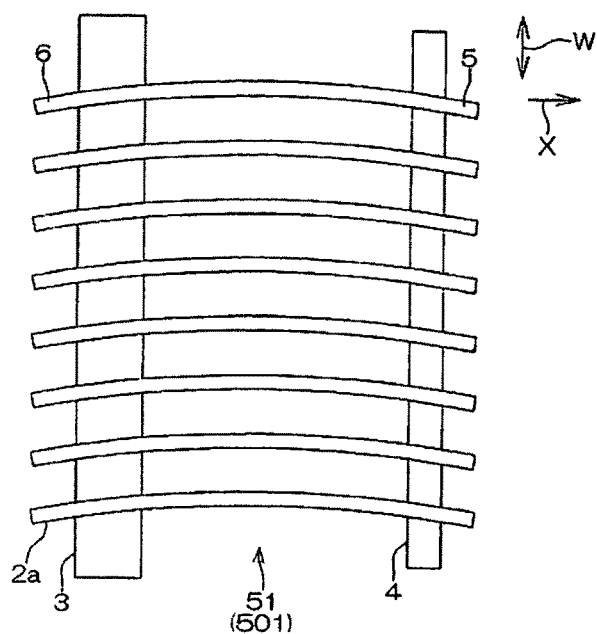
FIG. 10A is a diagram showing a main part of an embodiment of the invention as viewed along the orthogonal direction.
Figure 10B:
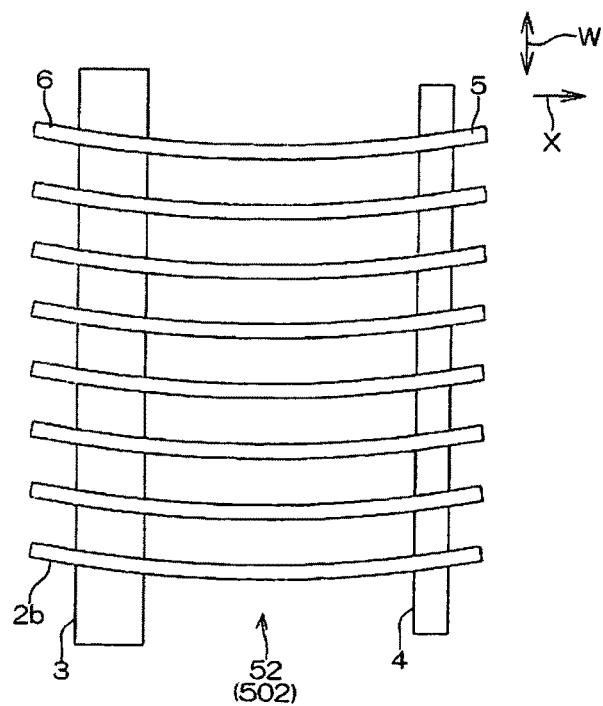
FIG. 10B is a diagram showing a main part of another embodiment of the invention as viewed along the orthogonal direction.

FIGS. 10A and 10B are diagrams of a main part of a further embodiment of the invention as viewed along the orthogonal direction V. Referring to FIGS. 10A and 10B, this embodiment is characterized in that a first specification link unit 501 (for example, a link unit 51) which includes only first specification link plates 2a and a second specification link unit 502 (for example, a link unit 52) which includes only second specification link plates 2b are provided.

The numbers of the first and second specification link units 501, 502 are made equal, and as a whole chain 1, the numbers of first and second specification link plates 2a, 2b are made equal.

For example, the first specification link unit 501 and the second specification link unit 502 are aligned so as to adjoin each other in the chain advancing direction X to form a pair, and pairs like this pair can be disposed sequentially in the chain advancing direction X.

According to this embodiment, the arrangement of the individual link plates 2 in each of the link units 51, 52, 53, . . . can be made simple, whereby the link plates 2 can be disposed simply and easily.

In each of the embodiments that have been described heretofore, two or more disposing patterns of the first and second specification link plates 2a, 2b which are shown respectively in FIGS. 6, 8, 9, 10A and 10B may be combined to form a plurality of link units 51, 52, 53, . . . .

Figure 11A:
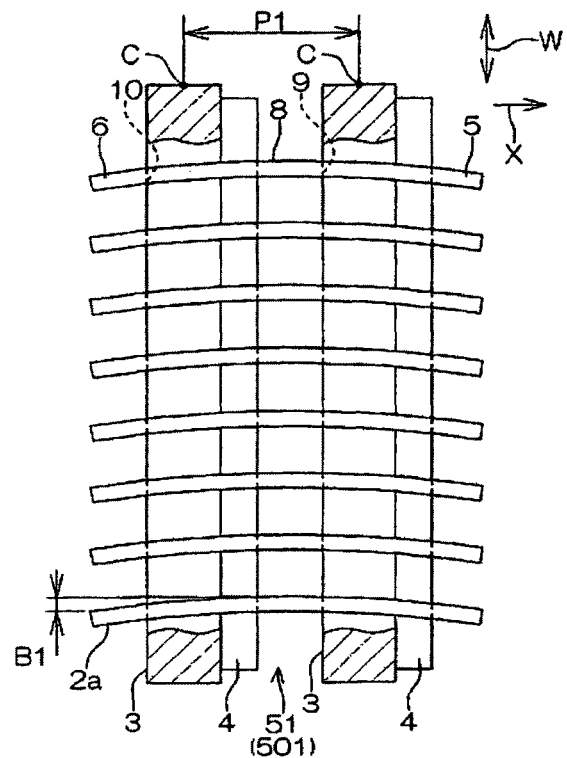
FIG. 11A is a diagram showing a main part of a further embodiment of the invention as viewed along the orthogonal direction.
Figure 11B:
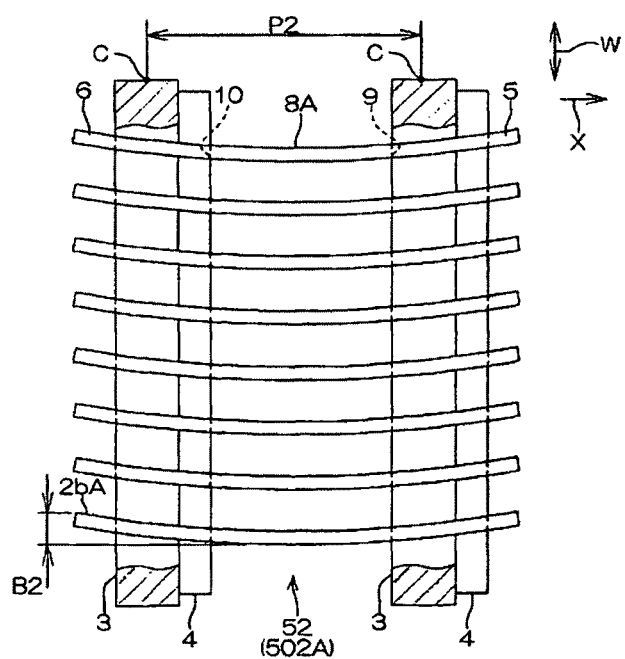
FIG. 11B is a diagram showing a main part of an embodiment of the invention as viewed along the orthogonal direction.

In addition, in place of the embodiment shown in FIGS. 10A and 10B, as shown in FIGS. 11A and 11B, a disposing pitch P1 with respect to either of first and second specification link plates 2a, 2b is made relatively short, while a disposing pitch P2 with respect to the other is made relatively long, and the first and second specification link plates 2a, 2bA (a first specification link unit 501 and a second specification link unit 502A) may be arranged at random in the chain advancing direction X.

Note that in this case, the disposing pitch P1 denotes a distance between contact center points C of a pair of first pins 3 which are inserted into a pair of through holes (a front through hole 9 and a rear through hole 10) in the link plate 2a to the first specification. In addition, the disposing pitch P2 denotes a distance between contact center points C of a pair first pins 3 which are inserted into a pair of through holes (a front through hole 9 and a rear through hole 10) in the link plate 2bA to the second specification.

As shown in FIGS. 11A and 11B, the disposing pitch P1 for the first specification link plates 2a is made relatively short, and the disposing pitch P2 for the second specification link plates 2bA is made relatively long. The length of a pillar portion 8A of the second specification link plate 2bA is made longer than the length of a pillar portion 8 of the first specification link plate 2a.

A warping amount B1 of the first specification link plate 2a is set approximately to a range from 5 μm to 10 μm, and a warping amount B2 of the second specification link plate 2bA is set approximately to a range from 20 μm to 30 μm.

The first specification link unit 501 and the second specification link unit 502A are arranged at random with respect to the chain advancing direction X. Note that in this case, the "random arrangement" means that at least one of the first and second specification link units 501, 502A is disposed irregularly in at least an area with respect to the chain advancing direction X. Note that the "irregular" means that the disposition of the link units lacks at least one of periodicity and regularity.

The first and second specification link units 501, 502A may be arranged at random over the whole area of the chain 1 in the chain advancing direction.

As an example of such a random arrangement, with respect to the chain advancing direction, the first specification link unit 501 and the second specification link unit 502A are arranged in the following order; 502A, 501, 501, 502A, 501, 501, 501, 502A, 501, 501, 501, 501, 501, 502A, 501, 501, 501, 501, 501, 501, 501, . . . .

Due to the length of the second specification link unit 502A being made longer with respect to the chain advancing direction X, a warping amount B2 of the second specification link plate 2bA is larger than a warping amount B1 of the link unit 501 to the first specification (B2>B1). Because of this, by the number of first specification link units 501 being made relatively large and the number of second specification link units 502A being made relatively small, it can be suppressed in an ensured fashion that the warp of the chain 1 becomes too large towards the other W2 side of the chain width direction W.

In addition, by the disposing pitch P1 for the first specification link plates 2a and the disposing pitch P2 for the second specification link plates 2bA being made to differ from each other, there can be provided a portion where an engagement cycle at which the first pin 3 is sequentially brought into engagement with the pulleys 60, 70 becomes uneven, whereby the frequency of engagement sound is dispersed so as to attain a further reduction in noise level. In addition, by the link plates having the different disposing pitches P1, P2 being made to warp in the directions opposite to each other, the identification of the disposing pitches P1, P2 can be implemented easily.

Further, by the first and second specification link units 501, 502A being arranged at random in the chain advancing direction X, the engagement cycle of the first pins 3 of the chain 1 with the individual pulleys 60, 70 can be made at random. By this, the engagement noise generating cycle between the chain 1 and the individual pulleys 60, 70 is made at random, whereby the frequency of the engagement noise can be made to be distributed over an extremely wide range, and consequently, noise generated as the chain 1 is driven can be reduced remarkably.

Note that in the embodiment shown in FIGS. 11A and 11B, the disposing pitch P1 for the first specification link unit 501 may be made relatively long and the disposing pitch P2 for the second specification link unit 502A may be made relatively short.

In addition, in the embodiment shown in FIGS. 11A and 11B, the disposing pattern for the first specification link unit 501 may be any of the disposing patterns shown in FIGS. 6, 8 and 9. Similarly, the disposing pattern for the second specification link unit 502A may be any of the disposing patterns shown in FIGS. 6, 8 and 9.

Further, the first specification link unit 501 may be formed using any two or more of the disposing patterns shown in FIGS. 6, 8, 9, 11A and 11B, and the second specification link unit 502A may be formed using any two or more of the disposing patterns shown in FIGS. 6, 8, 9, 11A and 11B.

In addition, in each of the embodiments that have been described heretofore, the first pin 3 may be fitted loosely in the rear through hole 10, and the second pin 4 may be fitted loosely in the front through hole 9. Further, the second pin 4 may be brought into engagement with the individual pulleys 60, 70.

Additionally, the numbers of link plates 2 of the individual link units 51, 52, 53, . . . may be uneven. For example, by employing a link unit which includes eight link plates 2 and a link unit which includes nine link plates 2, link units may be arranged so that the numbers of links in the link units arranged along the chain advancing direction X become 8, 8 and 9.

Figure 12:
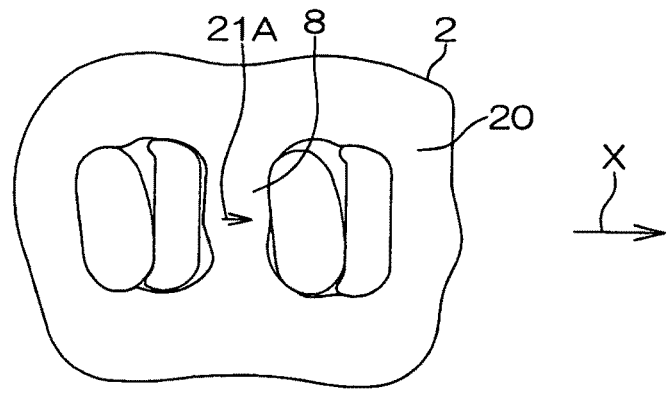
FIG. 12 is a diagram illustrating an identification portion of another embodiment of the invention.
Figure 13:
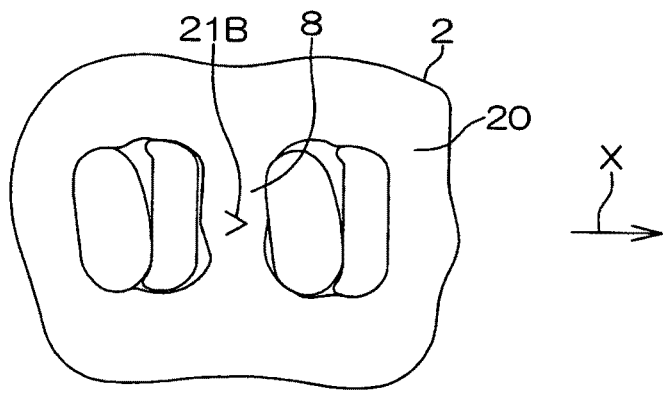
FIG. 13 is a diagram illustrating an identification portion of a further embodiment of the invention.
Figure 14:
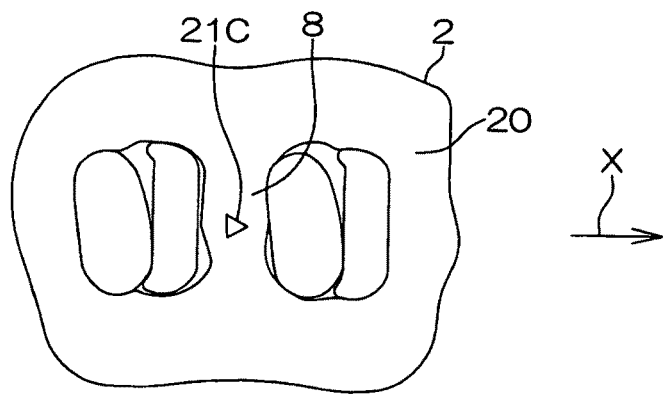
FIG. 14 is a diagram illustrating an identification portion of an embodiment of the invention.

Further, as the identification portions, there may be provided an identification portion 21A which has an arrow shape facing the chain advancing direction as shown in FIG. 12, an identification portion 21B which has a shape corresponding to an inequality sign as shown in FIG. 13 or an identification portion 21C which has a triangular shape as shown in FIG. 14.

In addition, a lot sign may be punched on the one side 20 of the first specification link plate 2a and a lot sign may be punched on the other side 22 of the second specification link plate 2b, 2bA, so that the punching directions A1, A2 are identified by the lot signs so punched.

Note that the identification portions in the respective embodiments that have been described heretofore are not only visible to the eyes of a human being but also able to be identified by conventionally known various types of identifying devices.

Further, the invention can be applied to a so-called block type chain which includes power transmission blocks which are fixed in place by pins or the like and are made to project further towards both sides of the chain width direction than the pins.

In addition, the invention is not limited to the form in which the groove widths of both the drive pulley 60 and the driven pulley 70 are made to change but may be applied to a form in which only the groove width of either of the drive pulley 60 and the driven pulley 70 is made to change, while the groove width of the other has a fixed width which is kept unchanged. Further, while in the embodiments described above, the invention is described as being applied to the form in which the groove width change continuously (in a stepless fashion), the invention may be applied to other power transmission systems which include a power transmission system in which the groove width/s change in a stepped fashion or a power transmission system in which the groove widths are fixed (kept unchanged).

The invention is not limited to the contents of the individual embodiments and can be modified variously within the scope of the claims thereof.

The invention claimed is:

1. A power transmission chain comprising:
   a plurality of link plates which are aligned in a chain advancing direction and;
   a plurality of connecting members which connect the link plates together in such a manner that the plurality of link plates can flex,
   wherein the plurality of link plates include first and second specification link plates which are punched from a material by a press, and
   wherein an entirety of the link plates are warped in chain width directions such that the first specification link plates and the second specification link plates are configured so as to warp in the chain width direction opposite to each other and are configured such that distal ends of the first specification link plates and the second specification link plates warp inwardly towards a center thereof, respectively.

2. The power transmission chain according to claim 1, wherein a plurality of link units which are aligned in the chain advancing direction are provided,
   wherein each of the link units includes a plurality of link plates which are aligned in a chain width direction orthogonal to the chain advancing direction, and
   wherein the plurality of link plates of each of the link units include the first and second specification link plates.

3. The power transmission chain according to claim 2, wherein in each of the link units, the first specification link plates and the second specification link plates are arranged alternately in the chain width direction.

4. The power transmission chain according to claim 2, wherein in each of the link units, the first specification link plates are disposed adjacent to each other and the second specification link plates are disposed adjacent to each other in the chain width direction.

5. The power transmission chain according to claim 1, wherein a plurality of link units which are aligned in the chain advancing direction are provided,
   wherein each of the link units includes a plurality of link plates which are aligned in a chain width direction orthogonal to the chain advancing direction, and wherein the plurality of link units include a first specification link unit which includes only the first specification link plates and a second specification link unit which includes only the second specification link plates.

6. The power transmission chain according to claim 5, wherein each of the connecting members includes a power transmission member which is brought into engagement with a sheave surface of a pulley to transmit power, wherein the power transmission member is inserted into each of a pair of through holes which are formed in each of the first specification link plate and the second specification link plate, and wherein a disposing pitch of the pair of power transmission members which are inserted into the pair of through holes of the first specification link plate is made relatively short, and a disposing pitch of the pair of power transmission members which are inserted into the pair of through holes of the second specification link plate is made relatively long.

7. The power transmission chain according to claim 1, wherein the first and second specification link plates include identification portions which indicate corresponding punching directions.

8. A power transmission system comprising:
first and second pulleys, each having a pair of conical sheave surfaces facing each other; and
the power transmission chain according to any claim 1, which is extended between the first and second pulleys in such a manner as to be wound therearound, so as to be brought into engagement with the sheave surfaces for transmission of power.

9. The power transmission system comprising:
first and second pulleys, each including a pair of conical sheave surfaces facing each other; and
the power transmission chain according to claim 2, which is extended between the first and second pulleys, in such a manner as to be wound therearound, so as to be brought into engagement with the sheave surfaces for transmission of power.

10. A power transmission system comprising:
first and second pulleys, each including a pair of conical sheave surfaces facing each other; and
the power transmission chain according to claim 3, which is extended between the first and second pulleys in such a manner as to be wound therearound, so as to be brought into the engagement with the sheave surfaces for transmission of power.

11. A power transmission system comprising:
first and second pulleys, each including a pair of conical sheave surfaces facing each other; and
the power transmission chain according to claim 4, which is extended between the first and second pulleys in such a manner as to be wound therearound, so as to be brought into engagement with the sheave surfaces for transmission of power.

12. A power transmission comprising:
first and second pulleys, each including a pair of conical sheave surfaces facing each other; and
the power transmission chain according to claim 5, which is extended between the first and second pulleys in such a manner as to be wound therearound, so as to be brought into engagement with the sheave surfaces for transmission of power.

13. A power transmission comprising:
first and second pulleys, each including a pair of conical sheave surfaces facing each other; and
the power transmission chain according to claim 6, which is extended between the first and second pulleys in such a manner as to be wound therearound as to be brought into engagement with the sheave surfaces for transmission of power.

14. A power transmission system comprising:
first and second pulleys, each having a pair of conical sheave surfaces facing each other; and
the power transmission chain according to claim 7, which is extended between the first and second pulleys in such a manner as to be wound therearound, so as to be brought into engagement with the sheave surfaces for transmission of power.

15. The power transmission system chain according to claim 1, wherein, as the first specification link plates extend in the chain advancing direction, both sides of the first specification link plates warp in one chain width direction and as the second specification link plates extend in the chain advancing direction, both sides of the second specification link plates warp in an opposite chain width direction.

16. The power transmission chain according to claim 1, wherein the first specification link plates warp, in an axial direction of the plurality of connecting members, towards one side of the power transmission chain, and the second specification link plates warp, in the axial direction, towards another side of the power transmission chain.

17. The power transmission chain according to claim 1, wherein a warped portion of the first specification link plates extends, in the chain advancing direction, from one end of the first specification link plates to another end of the first specification link plates.

18. The power transmission chain according to claim 1, wherein a warping distance, in the chain width direction, of the first specification link plates is substantially equal to a warping distance, in the chain width direction, of the second specification link plates.

19. The power transmission chain according to claim 1, wherein a gap, in the chain width direction, is formed between a center portion of the first specification link plates and a center portion of the second specification link plates.

20. The power transmission chain according to claim 1, wherein a total number of the first specification link plates is equal to a total number of the second specification link plates.

* * * * *